(12) United States Patent
Sasaoka

(10) Patent No.: US 9,135,085 B2
(45) Date of Patent: *Sep. 15, 2015

(54) EXCLUSIVE CONTROL METHOD OF RESOURCE AND EXCLUSIVE CONTROLLER OF RESOURCE

(71) Applicant: PANASONIC CORPORATION, Osaka (JP)

(72) Inventor: Toshio Sasaoka, Nara (JP)

(73) Assignee: SOCIONEXT INC., Kanagawa (JP)

(*) Notice: Subject to any disclaimer, the term of this patent is extended or adjusted under 35 U.S.C. 154(b) by 148 days.

This patent is subject to a terminal disclaimer.

(21) Appl. No.: 13/829,923

(22) Filed: Mar. 14, 2013

(65) Prior Publication Data

US 2013/0205057 A1   Aug. 8, 2013

Related U.S. Application Data

(60) Division of application No. 13/197,544, filed on Aug. 3, 2011, now Pat. No. 8,463,911, which is a continuation of application No. PCT/JP2009/006492, filed on Dec. 1, 2009.

(30) Foreign Application Priority Data

Feb. 17, 2009   (JP) .................................. 2009-033698

(51) Int. Cl.
G06F 15/173   (2006.01)
G06F 9/52   (2006.01)

(52) U.S. Cl.
CPC ...................................... *G06F 9/526* (2013.01)

(58) Field of Classification Search
CPC ...................................................... G06F 9/526
USPC ......................................................... 709/226
See application file for complete search history.

(56) References Cited

U.S. PATENT DOCUMENTS

| 4,663,709 A | 5/1987 | Fujiwara et al. |
| 5,274,809 A | 12/1993 | Iwasaki et al. |
| 8,141,083 B2 | 3/2012 | Olszewski et al. |

FOREIGN PATENT DOCUMENTS

| JP | 60-079460 A | 5/1985 |
| JP | 61-250765 A | 11/1986 |
| JP | 03-081859 B2 | 4/1991 |
| JP | 05-225149 A | 9/1993 |
| JP | 07-319716 A | 12/1995 |
| JP | 2001-084235 A | 3/2001 |

OTHER PUBLICATIONS

United States Notice of Allowance issued in U.S. Appl. No. 13/197,544 mailed on Apr. 9, 2013.

*Primary Examiner* — David X Yi
(74) *Attorney, Agent, or Firm* — McDermott Will & Emery LLP

(57) ABSTRACT

Under the circumstances that a lock object which performs a restriction control on an exclusive use of a sharable resource is granting a second information processor a right of prior use of the sharable resource over a first information processor, a time length of exclusive use during which the sharable resource is exclusively used by the second information processor is measured when an attempt to acquire the right of prior use requested by the first information processor for the lock object fails, and least two standby operations are set, the at least two standby operations being carried out by the first information processor until the right of prior use of the sharable resource granted to the second information processor is no longer valid, and the time length of exclusive use is compared to a decision threshold value preset for evaluation of the time length of exclusive use so that one of the standby operations suitable for a comparison result is selected.

14 Claims, 7 Drawing Sheets

F I G. 5
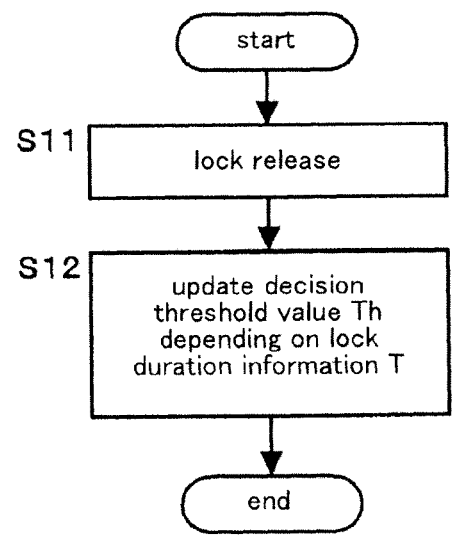

EXCLUSIVE CONTROL METHOD OF RESOURCE AND EXCLUSIVE CONTROLLER OF RESOURCE

CROSS REFERENCE TO RELATED APPLICATIONS

This application is a Divisional of U.S. application Ser. No. 13/197,544, filed Aug. 3, 2011, which is a continuation of PCT International Application No. PCT/JP2009/006492, filed on Dec. 1, 2009, which in turn claims the benefit of Japanese Application No. 2009-033698, filed on Feb. 17, 2009, the disclosures of which Applications are incorporated by reference herein.

FIELD OF THE INVENTION

The present invention relates to a resource exclusive control method and a resource exclusive controller used for exclusive control between a plurality of information processors capable of concurrently executing processes, more particularly to a technology for improving the usability of information processors by minimizing a processing idle time in the information processors as resource devices which occurs when any of the information processors fails to acquire a right of prior use of a sharable resource in a lock object.

BACKGROUND OF THE INVENTION

When a resource is shared by a plurality of information processors in a multiple information processing system (multiprocessor system) in which processes are concurrently executed by the plurality of information processors, it is necessary to exclusively control the sharable resource (mutual exclusion) between the information processors in order to ensure a consistency in sharing the resource.

The consistency in sharing the resource was conventionally supported, for example, as described below. An information processor acquires a right of prior use of a sharable resource in a lock object and then uses the sharable resource. When the sharable resource is no longer used, the information processor returns the right of prior use to release the sharable resource. This conventional method prevents a plurality of information processors from accessing the sharable resource at the same time, thereby supporting the consistency in sharing the resource. Hereinafter, "lock" is a term used to express acquisition of a right of prior use of a sharable resource in a lock object, and "unlock" is a term used to express returning the right of prior use to release the sharable resource.

There are two standby operations for exclusive control carried out by the lock object to lock the sharable resource; spin lock operation, and suspend lock operation. Describing the spin lock operation, an information processor repeatedly checks the lock object until the lock succeeds. The standby operation called the suspend lock standby operation is described below. When an information processor (first information processor) fails to achieve the lock because of the ongoing lock for the sharable resource in the lock object won by another information processor (second information processor), the first information processor switches its own process to execute from a first process which requires the lock for the sharable resource to a second process which does not require the lock for the sharable resource (context switch), making the first process sleep. When the lock won by the second information processor for the sharable resource is thereafter is released, the first information processor attempts again to achieve the lock for the sharable resource from the lock object, and then switches the process back to the first process from the second process (wakeup) when the attempt is successful. The "suspend" used in the term means putting the first process "on hold".

The spin lock operation leaves the information processor busy-waiting to disallow the information processor to execute any other process during the spin (sleep) of the first process, thereby creating a processing idle time in the information processor as a resource device.

When an attempt to win the lock fails during the suspend lock operation, a right of execution in the first information processor is transferred from the first process to the second process. Therefore, there is no processing idle time in the first information processor. The suspend lock operation, however, still needs a processing time for the context switch to make the process sleep and wake up, thereby increasing an overhead (overall processing time).

To solve these technical problems, the two standby operations are conventionally switched to and from each other in a timely manner. There are two manners of operation switching; static switching and dynamic switching. The static switching has the following disadvantages; the spin continues as long the lock fails even over a long period of time, and the sleep is inevitable although the lock will succeed soon, thereby creating a processing idle time in the information processor as a resource device. Therefore, the dynamic switching is attracting attention.

The technical ideas of the dynamic switching thus far disclosed are; determine whether a lock-winning process is in execution (whether the process is granted a right of execution by an information processor) and decide which of the standby operations should be selected based on a determination result thereby obtained (see the Patent Document 1, hereinafter, called prior art 1), and attempt the lock during the spin lock operation and switch to the suspend lock operation if the lock still fails after the sleep over a given period of time (see the Patent Document 2, hereinafter, called prior art 2).

PRIOR ART DOCUMENT

Patent Documents

Patent Document 1: Unexamined Japanese Patent Applications Laid-Open No. 07-319716
Patent Document 2: Unexamined Japanese Patent Applications Laid-Open No. 05-225149

SUMMARY OF THE INVENTION

Problem to be Solved by the Invention

The prior art 1, wherein the spin continues when the lock fails over a long period of time as long as the process which acquired the lock for the sharable resource is in execution, creates a processing idle time in the information processor as a resource device.

According to the prior art 2, the spin lock operation is switched to the suspend lock operation because the attempt to win the lock for the sharable resource fails even after the spin continued over a given period of time. When the lock to be desirably acquired in the lock object is released immediately after the sleep started, the system configuration makes it necessary to wake up the process as soon as the lock in the lock object is released. As a result of the wakeup (context switch), however, an overhead is increased.

The present invention was accomplished to solve these conventional technical problems. Therefore, a main object of the present invention is to improve the usability of information processors when the lock for a sharable resource is desirably acquired in a lock object.

Means for Solving the Problem

A resource exclusive control method according to the present invention is a resource exclusive control method used for exclusive control of a sharable resource between a plurality of information processors capable of concurrently executing processes, comprising:

a step in which under the circumstances that a lock object which performs a restriction control on an exclusive use of the sharable resource is granting a second information processor a right of prior use of the sharable resource over a first information processor, a time length of exclusive use during which the sharable resource is exclusively used by the second information processor is measured when an attempt to acquire the right of prior use requested by the first information processor for the lock object fails, and a step in which at least two standby operations are set, the at least two standby operations being carried out by the first information processor until the right of prior use of the sharable resource granted to the second information processor is no longer valid, and the time length of exclusive use is compared to a decision threshold value preset for evaluation of the time length of exclusive use so that one of the standby operations suitable for a comparison result thereby obtained is selected.

A resource exclusive controller according to the present invention comparable to the resource exclusive control method comprises structural elements configured to carry out the technical idea according to the method. The resource exclusive controller according to the present invention is a resource exclusive controller which performs an exclusive control of a sharable resource between a plurality of information processors capable of concurrently executing processes, comprising:

a lock object which performs a restriction control on an exclusive use of the sharable resource;

a lock duration obtaining unit configured to, under the circumstances that the lock object is granting a second information processor a right of prior use of the sharable resource over a first information processor, measure a time length of exclusive use during which the sharable resource is exclusively used by the second information processor when an attempt to acquire the right of prior use requested by the first information processor for the lock object fails;

a group of standby operation mechanisms including at least two standby operation mechanisms to be carried out by the first information processor until the right of prior use of the sharable resource granted to the second information processor is no longer valid; and a lock standby operation selector unit configured to compare the time length of exclusive use to a decision threshold value preset for evaluation of the time length of exclusive use to select one of the standby operation mechanisms suitable for a comparison result thereby obtained.

According to the present invention thus technically characterized, under the circumstances that the lock object is granting the second information processor the right of prior use of the sharable resource over the first information processor, the time length of exclusive use during which the sharable resource is exclusively used by the second information processor is measured when the attempt to acquire the right of prior use requested by the first information processor for the lock object fails, and the time length of exclusive use is compared to the decision threshold value preset for evaluation of the time length of exclusive use so that one of the standby operations suitable for the comparison result thereby obtained is selected.

There are other modes of the present invention described below.

The group of standby operations includes:

a spin lock operation in which the first information processor repeatedly checks the lock object until the right of prior use is acquired; and a suspend lock operation in which the first information processor puts a first process which demands the right of prior use to a temporary sleep until the right of prior use granted to the second information processor is no longer valid and then requests again the lock object to acquire the right of prior use as soon as the right of prior use granted to the second information processor is no longer valid, and the first information processor wakes up the first process when the right of prior use is successfully acquired, wherein it is decided that the right of prior use granted to the second information processor will be shortly invalid when the time length of exclusive use exceeds the decision threshold value so that the spin lock operation is selected, and it is decided that the right of prior use granted to the second information processor will not be shortly invalid when the time length of exclusive use is at most the decision threshold value so that the suspend lock operation is selected. To make these decisions, it is estimated how long it takes for the first information processor to acquire the right of prior use of the sharable resource. In either of the decisions, it is necessary to wait for the right of prior use granted to the second information processor over the first information processor to become invalid. However, an overhead for exclusive control is consequently reduced no matter which of the standby operations is selected because the time length of exclusive use is compared to the decision threshold value and one of the standby operations more suitable for the comparison result is selected. As a result, the first information processor as a resource device can improve its own usability.

During the spin lock operation (mechanism), the attempt to acquire the right of prior use is repeatedly requested until the first information processor acquires the right of prior use of the sharable resource from the lock object. During the ongoing attempt to acquire the right of prior use, the first information processor is busy-waiting. When the time length of exclusive use exceeds the decision threshold value, the lock object will shortly invalidate the right of prior use of the sharable resource granted to the second information processor to grant the right of prior use to the first information processor sooner than usual. Therefore, the first information processor may be busy-waiting but only for a short while, which significantly reduces a processing idle time of the first information processor as a resource device.

When the first information processor is put to sleep and the lock object invalidates the right of prior use of the sharable resource granted to the second information processor during the suspend lock operation, the first information processor is waken up so that the first information processor recovered from the sleep requests the lock object again to grant the right of prior use. In a series of these processing steps, a right of execution in the first information processor is switched from a process which demands the right of prior use of the sharable resource to another process until the right of prior use of the sharable resource owned by the second information processor is released. When the first information processor detects that the right of prior use of the sharable resource granted to the second information processor is no longer valid in the lock object, the first information processor is waken up. This avoids such an unfavorable event that the first information processor, which is a resource device, is idly unused. Then, the right of prior use of the sharable resource requested by the first information processor is approved by the lock object unless the right of prior use of the sharable resource is requested by another information processor. Though the processing steps between the sleep and the wakeup (context switch operation) need a largest amount of operation time estimated beforehand, any unnecessary processing time is thereby consumed. The standby operation thus configured is a reasonably efficient standby operation.

As described so far, the present invention can avoid the spin lock operation which is unnecessarily prolonged over a long period of time and increase of the overhead due to context switch, consequently improving the usability of the first information processor which is a resource device.

The group of standby operations (mechanisms) is not necessarily limited to the spin lock operation and the suspend lock operation, and the standby mechanisms may be differently arranged. Other examples of the standby mechanism are; decreasing number of clocks in the first information processor, putting the first information processor in a sleep mode (clock supply suspension mode), and prefetching caches in the first information processor. In place of hardware, software may be used to provide a similar configuration.

According to a preferred mode of the present invention, the time length of exclusive use is a length of time from a system time when the right of prior use is acquired by the second information processor to a system time at present. According to the mode thus technically characterized, the system time when the right of prior use is acquired by the second information processor (stored in the lock object) is read and subtracted from the system time at present so that the time length of exclusive use is calculated.

According to another preferred mode of the present invention, the time length of exclusive use is a count value at present of a timer turned on when the right of prior use is acquired by the second information processor. According to the mode thus technically characterized, the time length of exclusive use can be obtained without providing an additional device used to store a lock start time in the lock object.

According to still another preferred mode of the present invention, the decision threshold value is dynamically updated depending on the time length of exclusive use. According to the mode thus technically characterized, the decision threshold value can be newly set depending on the time length of exclusive use. As a result, the decision threshold value can be updated in a manner suitable for an actual operation so that one of the lock standby operation mechanisms more efficient than the other can be selected.

In the mode previously described wherein the decision threshold value is dynamically updated depending on the time length of exclusive use, the decision threshold value is preferably dynamically updated when the time length of exclusive use falls below the decision threshold value. In the case where the time length of exclusive use is smaller than the decision threshold value, the decision threshold value has too a large value. To dynamically update the decision threshold value, the time length of exclusive use at the time, for example, is newly set as the decision threshold value. As a result, the decision threshold value can be updated in a manner suitable for an actual operation so that one of the lock standby operation mechanisms more efficient than the other can be selected.

To dynamically change the decision threshold value, the decision threshold value is preferably updated to an average value of the time lengths of exclusive use. As a result, the decision threshold value can be updated in a manner suitable for an actual operation so that one of the lock standby operation mechanisms more efficient than the other can be selected.

According to still another preferred mode of the present invention, a plurality of the first information processors are provided, and the decision threshold value is set for each of the plurality of the first information processors. In the case processing contents of the information processors are more or less biased, the decision threshold value can be differently set depending on the processing contents of the information processors. As a result, one of the lock standby operation mechanisms more efficient than the other can be selected.

According to still another preferred mode of the present invention, the information processors are processors in a multiprocessor system, wherein the lock objet is a lock object for exclusive control between the processors in the multiprocessor system.

This mode is one of the most suitable applications of the present invention.

Examples of the sharable resource that can be used are a shared memory and various devices arbitrarily selected.

Effect of the Invention

According to the present invention, an overhead generated when the first information processor acquires the right of prior use of the sharable resource is minimized. As a result, the usability of the first information processor, which is a resource device, can be improved.

BRIEF DESCRIPTION OF THE DRAWINGS

FIG. 5 is a flow chart of a lock release routine in the resource exclusive controller according to the exemplary embodiment 2.

EXEMPLARY EMBODIMENTS FOR CARRYING OUT THE INVENTION

Figure 1:
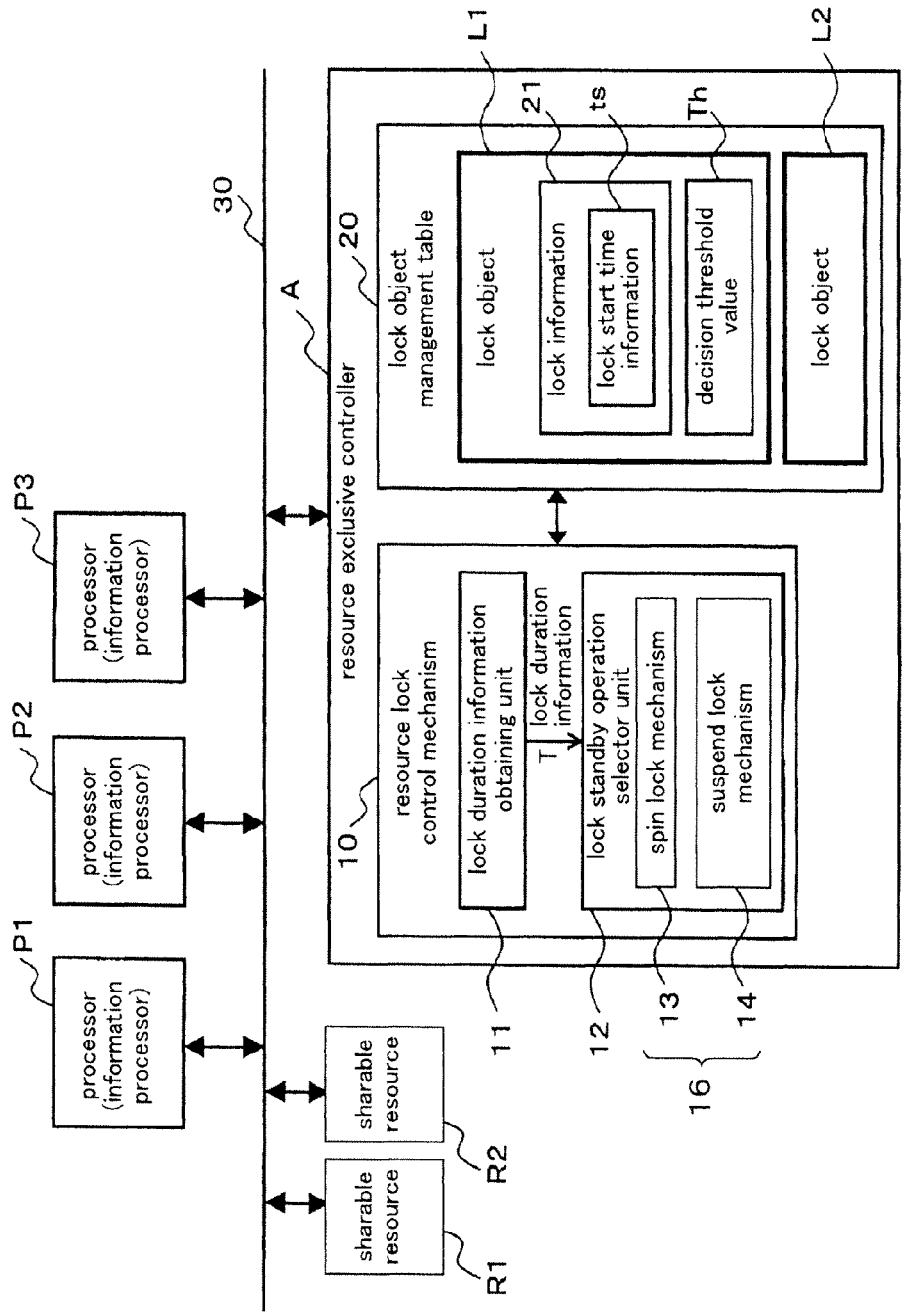
FIG. 1 is a block diagram illustrating a system configuration of a multiprocessor system provided with a resource exclusive controller according to an exemplary embodiment 1 of the present invention.

Hereinafter, exemplary embodiments of a resource exclusive control method and a resource exclusive controller according to the present invention are described in detail referring to the drawings. Any terms used in the description of exemplary embodiments given below are configured similarly to those used in conventional examples. The following terms, however, are particularly important and described in detail below. A lock object is a device responsible for management of a sharable resource to check whether the sharable resource is locked (a right of prior use of the sharable resource is granted to a process) or unlocked (the right of prior use of the sharable resource is not granted to any process). The lock object is further responsible for identifying and managing which information processor executes a process currently locking the sharable resource. The information managed by the lock object is called a lock information. Whenever the sharable resource is used, it is necessary to acquire the lock object beforehand. Any information processor which has not succeeded in acquiring the lock object is never allowed to use the sharable resource. One of information processors in a system can exclusively acquire the lock object, and the lock object already acquired by an information processor cannot be acquired by any other information processor. This ensures that the only information processor allowed to use the sharable resource corresponding to the lock object is the information processor which already acquired the lock object, thereby guaranteeing that a sequence of processing steps for the lock-acquired information processor to access and use the sharable resource are inseparably carried out (atomicity). It is called "lock acquisition" that the right of prior use of the sharable resource is acquired by an arbitrarily information processor (first information processor).

Exemplary Embodiment 1

FIG. 1 is a block diagram illustrating a system configuration of a multiprocessor system provided with a resource exclusive controller according to an exemplary embodiment 1 of the present invention. The multiprocessor system has a plurality of processors P1, P2, and P3 which represent a plurality of information processors, a plurality of sharable resources R1 and R2, and a resource exclusive controller A. The resource exclusive controller A includes a resource lock control mechanism 10 and a lock object management table 20. A reference symbol 30 illustrated in the drawing denotes a bus which interconnects the processors P1, P2, and P3, sharable resources R1 and R2, and resource exclusive controller A. Structural elements of the resource exclusive controller A are described below.

The resource lock control mechanism 10 includes a lock duration information obtaining unit 11, a lock standby operation selector unit 12, and a group of lock standby operation mechanisms 16. The lock duration information obtaining unit 11 is configured to measure a lock duration information T indicating a time length of exclusive use of an arbitrary sharable resource (hereinafter, called sharable resource RX) which is a length of time between a present time point and a time point when the lock of the sharable resource RX already acquired by a processor started (the processor represents a second information processor, hereinafter called lock previously-acquiring processor PY) and transmit the measured lock duration information T to the lock standby operation selector unit 12.

The group of lock standby operation mechanisms 16 includes a spin lock mechanism 13 and a suspend lock mechanism. The spin lock mechanism 13 is configured to perform a spin lock operation. The spin lock operation is a locking operation in which a processor (the processor represents a first information processor, hereinafter called lock currently-requesting processor LX) making a request of lock acquisition of the sharable resource RX to a lock object provided for the sharable resource RX (hereinafter, called lock object LX) continues to make the request of lock acquisition to the lock object LX until the sharable resource RX is locked.

The suspend lock mechanism 14 is configured to perform a suspend lock (sleep-lock) operation. The suspend lock operation is a locking operation in which the lock currently-requesting processor PX puts a process currently executed therein to a temporary sleep until the lock acquisition succeeds when the lock currently-requesting processor PX is unable to lock the sharable resource RX because the lock previously-acquiring processor PY already acquired the lock of the sharable resource RX from the lock object LX, and the lock currently-requesting processor PX wakes up the sleeping process and then restarts the lock acquisition when the lock previously-acquiring processor PY unlocks the sharable resource RX in the lock object LX (lock release).

The lock standby operation selector unit 12 selects one of the spin lock mechanism 13 and the suspend lock mechanism 14. The lock standby operation selector unit 12 selects one of the mechanisms depending on the time length of exclusive use indicated by the lock duration information T of the lock previously-acquiring processor. The lock standby operation selector unit 12 obtains the lock duration information T from the lock duration information obtaining unit 11.

The time length of exclusive use indicated by the lock duration information T may be variable in different situations now and then. However, the time length does not increase or decrease while the decision is being made but is instantaneously decided whenever the decision is made. Therefore, the time length may be variously different, long or short, when the lock duration information T is instantaneously obtained.

The lock standby operation selector unit 12 compares the time length of exclusive use indicated by the obtained lock duration information T (hereinafter, simply called lock duration information T) to a decision threshold value Th of the lock duration information T. The decision threshold value Th is stored in the lock object management table 20. When learnt from a comparison result thereby obtained that the lock duration information T exceeds the decision threshold value Th (T>Th), the lock standby operation selector unit 12 selects the spin lock mechanism 13. When the lock duration information T is at most the decision threshold value Th according to the comparison result (T≤Th), the lock standby operation selector unit 12 selects the suspend lock mechanism 14. When one of the spin lock mechanism 13 and the selection of the suspend lock mechanism 14 is selected, there is no preference for one of them over the other (which will be described in detail later).

The lock object management table 20 stores therein the lock objects L1 and L2 which are as many lock objects as the two sharable resources R1 and R2. The lock objects L1 and L2 are respectively provided so as to correspond with the sharable resources R1 and R2. The lock objects L1 and L2 store therein a lock information 21 and the decision threshold value Th. The lock information 21 includes a lock start time information $t_s$ indicating a time point when the lock acquisition for the lock object L1, L2 started.

The resource lock control mechanism 10 checks the lock object management table 20 when the lock acquisition for the sharable resource RX is requested by the lock currently-requesting processor LX. The table is checked to confirm whether the lock object LX provided correspondingly with the sharable resource RX to be desirably locked is locked. When confirmed that the sharable resource RX is unlocked, the lock object LX immediately responds to the requested lock acquisition and locks the sharable resource RX, and records the lock start time information $t_s$ in the lock information 21 of the lock object LX. When confirmed that the sharable resource RX is locked, the lock object LX starts the operations of the lock duration information obtaining unit 11 and the lock standby operation selector unit 12.

When the lock duration information obtaining unit 11 is turned on, the lock duration information obtaining unit 11 checks the lock object management table 20. More specifically, the lock duration information obtaining unit 11 reads the lock start time information $t_s$ from the lock information 21 of the lock objects LX corresponding to the lock previously-acquiring processor PY and the lock currently-requesting processor PX, and calculates the lock duration information T indicating the time length of exclusive use of the sharable resource RX by the lock previously-acquiring processor PY between the lock start time and the present time point based on the read lock start time information $t_s$. Then, the lock duration information obtaining unit 11 outputs the calculated lock duration information T to the lock standby operation selector unit 12. Assuming that a current time point is $t_0$, the lock duration information T (which is the time length of exclusive use indicated by the information T) is $T=t_0-t_s$ as illustrated in FIG. 2.

Figure 2:
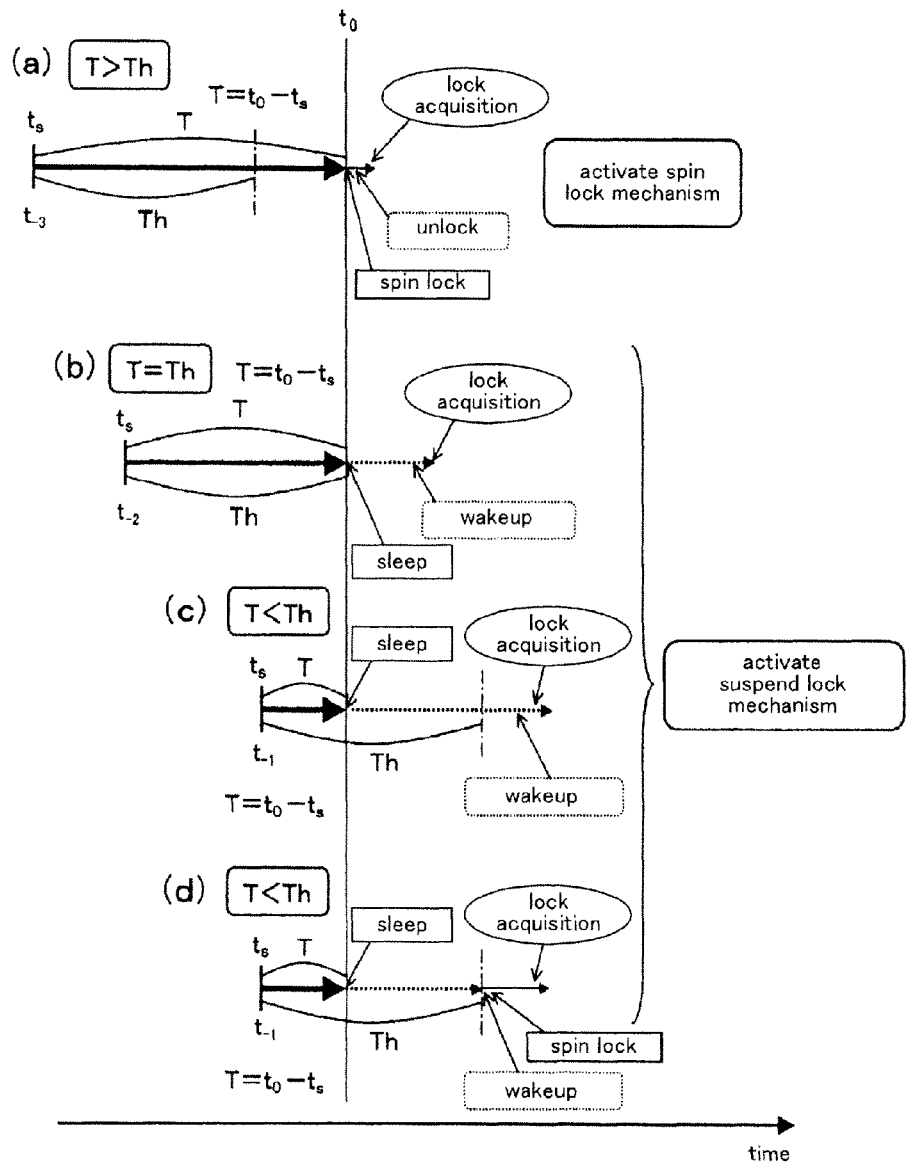
FIG. 2 illustrates an operation principle of the resource exclusive controller according to the exemplary embodiment 1.

When the lock standby operation selector unit 12 received the lock duration information T of the lock previously-acquiring processor PY from the lock duration information obtaining unit 11, the lock standby operation selector unit 1 checks the lock object management table 20. More specifically, the lock standby operation selector unit 12 reads the decision threshold value Th from the lock object LX and compares the read decision threshold value Th to the lock duration information T. Based on a comparison result thereby obtained, the lock standby operation selector unit 12 selects one of the mechanisms as follows:

selects the spin lock mechanism 13 when the comparison result says T>Th (see a) in FIG. 2); and
selects the suspend lock mechanism 13 when the comparison result says T≤Th (see b)-d) in FIG. 2).

It is assumed that the processor P2 is now holding the lock acquisition of the lock object L1 for the sharable resource R1 (processor P2=second information processor). The lock start time information $t_s$ of the lock information 21 of the lock object L1 is stored in the lock object L1 corresponding to the sharable resource R1 of the lock object management table 20 in the resource exclusive controller A. In the situation thus assumed, the processor P1 (processor P1=first information processor) requests to access the sharable resource R1 (lock acquisition request).

Then, the lock acquisition for the sharable resource R1 requested by the processor P1 is transmitted to the resource exclusive controller A by way of the bus 30. The resource exclusive controller A receives the request, and then turns on the resource lock control mechanism 10 to check the lock object management table 20. Because the lock acquisition request is targeted for the sharable resource R1, the lock object L1 corresponding to the sharable resource R1 is checked. Then, it is known from the table that the sharable resource R1 is already locked by the processor P2. After confirming that the sharable resource R1 is already locked, the lock duration information obtaining unit 11 obtains the lock start time information $t_s$ from the lock object L1. The lock start time information $t_s$ obtained then is information of a time point when the lock acquisition for the sharable resource R1 by the lock previously-acquiring processor P2 started. Based on the obtained lock start time information $t_s$, the lock duration information obtaining unit 11 calculates the lock duration information T ($T=t_0-t_s$) indicating the time length of exclusive use between the present time and the time point when the lock previously-acquiring processor P2 succeeded in locking the sharable resource R1, and transmits the calculated lock duration information T to the lock standby operation selector unit 12.

The lock standby operation selector unit 12 which received the lock duration information T compares the received lock duration information T to the decision threshold value Th of the lock object L1. When the lock standby operation selector unit 12 confirmed from a comparison result thereby obtained that the lock duration information T (which is the time length of exclusive use indicated by the information T) is larger than the decision threshold value Th (T>Th) as illustrated in a) of FIG. 2, the lock standby operation selector unit 12 selects and activates the spin lock mechanism 13. More specifically, the lock standby operation selector unit 12 selects and activates the spin lock mechanism 13 when confirmed that the lock start time information $t_s$ indicating the time point when the lock acquisition by the processor P2 (lock previously-acquiring processor PY) started is relatively away timewise from a time point indicated by the present time information $t_0$ ($t_s=t_{-3}$) and the time length of exclusive use indicated by the lock duration information T is presently larger than the decision threshold value Th (T>Th).

On the other hand, when confirmed that the time length of exclusive use indicated by the lock duration information T is equal to or smaller than the decision threshold value Th (T≤Th) as illustrated in b)-d) of FIG. 2, the lock standby operation selector unit 12 selects and activates the suspend lock mechanism 14. For example, the lock start time indicated by the lock start time information $t_s$ is close timewise to the present time point indicated by the present time information $t_0$ ($t_s=t_2$), and a time point when the time length of exclusive use indicated by the lock duration information T equals to the decision threshold value Th is the present time point indicated by the present time information $b_0$ as illustrated in b) of FIG. 2, in which case T=Th. Therefore, the lock standby operation selector unit 12 selects the suspend lock mechanism 14. When, for example, determined that the lock start time indicated by the lock start time information $t_s$ is even closer timewise to the present time point indicated by the present time information $t_0$ than the illustration in b) of FIG. 2 ($t_s=t_{-1}$), and the time length of exclusive use indicated by the lock duration information T is presently still below the decision threshold value Th as illustrated in c) and d) of FIG. 2, the lock standby operation selector unit 12 selects the suspend lock mechanism 14. In a)-d) of FIG. 2, the decision threshold value represents an equal time length.

When the spin lock mechanism 13 is activated by the lock standby operation selector unit 12 as illustrated in a) of FIG. 2, the spin lock mechanism 13 spinlocks the lock currently-requesting processor PX, meaning that the check continues until the lock acquisition of the lock object succeeds. Though the lock currently-requesting processor PX stays busy-waiting during the spin lock, a timing by which the lock previously-acquiring processor PY unlocks the lock object arrives relatively soon from now because the time length of exclusive use indicated by the lock duration information T is larger than the decision threshold value (T>Th). Therefore, it can be estimated that the lock currently-requesting processor PX requests to lock the lock object relatively soon. The lock currently-requesting processor PX may be left busy-waiting but only for a short while. Therefore, a processing idle time in the processor, which is a resource device, can be significantly reduced.

As illustrated in b) and c) of FIG. 2, when the suspend lock mechanism 14 is activated by the lock standby operation selector unit 12, the suspend lock mechanism 14 puts a lock-requesting process currently executed by the lock currently-requesting processor PX to a temporary sleep. Until the lock object LX releases the lock acquisition (unlocks) of the sharable resource R1 by the lock previously-acquiring processor PY, a right of execution in the lock currently-requesting processor PX is switched from the lock-requesting process to another process. When the lock object LX unlocks the sharable resource R1 so far locked by the lock previously-acquiring processor PY, the lock currently-requesting processor PX wakes up the lock-requesting process. Then, the right of execution in the lock currently-requesting processor PX is switched back to the lock-requesting process. This avoids such a waste of resource in the lock currently-requesting processor PX as creating a processing idle time. The lock-requesting process of the lock currently-requesting processor PX thus recovered from the sleep requests again the lock acquisition for the sharable resource RX to the resource exclusive controller A. Unless any other processor already requested to lock the sharable resource RX, the sharable resource RX is locked as requested under the approval by the lock object LX. Though the context switch operation at the time for the recovery from the sleep needs a largest amount of operation time estimated for the operation, any unnecessary processing time is thereby consumed. The standby operation thus configured is a reasonably efficient standby operation.

There is the following standby manner other than the standby technique described so far. When the lock-requesting process currently executed in the lock currently-requesting processor PX is put to a temporary sleep, the lock-requesting process is connected to a tail end of wait cues corresponding to the sharable resource RX, the lock-requesting process connected to a top of the wait cues locks the sharable resource RX in the lock object LX when the lock object LX unlocks the sharable resource RX so far locked by the lock previously-acquiring processor PY, and the lock-requesting process is then removed from the wait cues to wake up. The process connected to any of the wait cues but to the top wait cue is still sleeping at the time. The lock-requesting process which woke up later already succeeded in locking the sharable resource, and it is unnecessary to request the lock acquisition again, thereby preventing the process from failing the lock acquisition again after the wakeup.

The wakeup timing may be set such that, as illustrated in d) of FIG. 2, interrupt is generated at a time point later by the time length indicated by the decision threshold value Th than the time point indicated by the lock start time information $t_s$ to wake up the process. When the timing is thus set, the lock standby may be differently arranged. For example, the lock-requesting process is left on standby until the lock previously-acquiring processor PY unlocks the sharable resource RX in the lock object LX by, for example, spin lock. According to the lock standby thus arranged, the lock currently-requesting processor PX can succeed in locking the sharable resource earlier by an overhead time required for the context switch process than waking up the lock-requesting process after the lock object LX unlocks the sharable resource RX locked by the lock previously-acquiring processor PY. The lock standby thus arranged makes it appear from the aspect of the lock previously-acquiring processor PY as if the lock currently-requesting processor PX was left on spinlock standby from the beginning. As a result, the lock currently-requesting processor PX can achieve the lock acquisition for the sharable resource RX as fast as the spin lock operation at the time of lock release for the sharable resource RX currently locked by the lock previously-acquiring processor PY. Another advantage is to use the processor to execute another process. Therefore, the usability of the processor, which is a resource device, can be improved by effectively using the period of time until the lock acquisition succeeds.

Figure 3A:
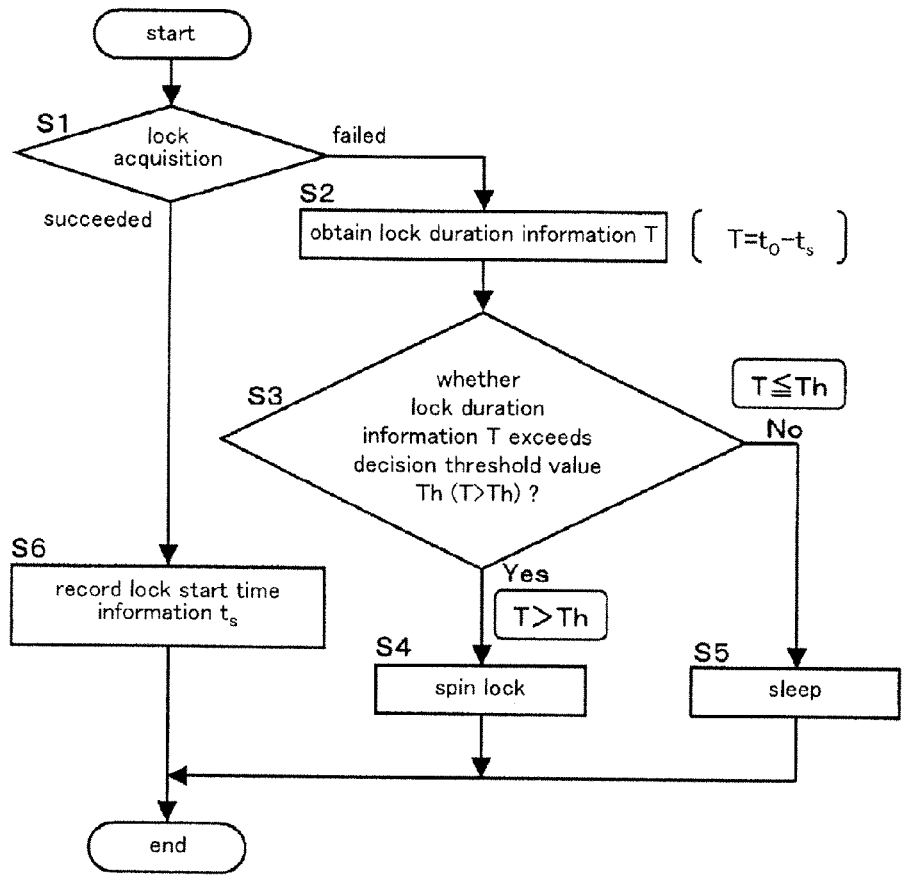
FIG. 3A is a flow chart of a lock acquisition routine in the resource exclusive controller according to the exemplary embodiment 1.
Figure 3B:
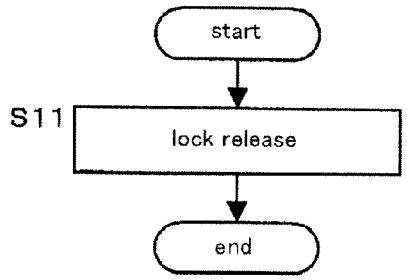
FIG. 3B is a flow chart of a lock release routine.

The operation of the resource exclusive controller according to the present exemplary embodiment thus technically characterized is described referring to flow charts illustrated in FIGS. 3A and 3B. FIG. 3A illustrates a flow of lock acquisition processing steps for the lock object according to the exemplary embodiment 1. FIG. 3B illustrates a flow of lock release (unlocking) processing steps for the lock object.

The lock currently-requesting processor PX trying to use the sharable resource RX which needs inter-processor exclusive control makes an attempt for lock acquisition to the lock object corresponding to the sharable resource RX before using the sharable resource RX. The lock acquisition attempt is transmitted to the resource exclusive controller A.

In Step S1, the resource lock control mechanism 10 checks the lock object LX to be desirably locked to confirm whether the lock object LX is already locked. When the resource lock control mechanism 10 learnt that the lock object LX is already locked, the resource lock control mechanism 10 determines that the attempt at the time by the lock currently-requesting processor PX to acquire the lock object failed, and the processing flow proceeds to Step S2. When learnt that the lock object LX is unlocked, on the other hand, the resource lock control mechanism 10 determines that the attempt at the time by the lock currently-requesting processor PX to acquire the lock object succeeded, and the processing flow proceeds to Step S6.

A description given below starts with Step S2 to simplify the description. The processing flow proceeds to Step S2 when the lock currently-requesting processor PX failed the lock acquisition because the lock previously-acquiring processor PY already acquired the lock object LX. Subsequent to the situation described above, the lock duration information obtaining unit 11 calculates the lock duration information T from the lock start time information $t_s$ included in the lock object LX corresponding to the sharable resource RX. The lock duration information T is calculated as described below. The lock start time information $t_s$ of the lock previously-acquiring processor PY is read from the lock objet LX, and a length of time between the time point indicated by the present time information $t_0$ and the time point indicated by the lock start time information $t_s$ is calculated ($T=t_0-t_s$), so that the lock duration information T is calculated.

The calculated lock duration information T represents the length of time between the time point when the lock previously-acquiring processor succeeded in acquiring the lock object and the present time point (time length of exclusive use of the sharable resource RX). The length of time thus obtained is variable depending on a current situation then. The length of time indicated by the lock duration information T may be at least the decision threshold value (T>Th) as illustrated in a) of FIG. 2, the length of time may be equal to the decision threshold value Th (T=Th) as illustrated in b) of FIG. 2, or the length of time may be below the decision threshold value Th (T<Th) as illustrated in c) of FIG. 2. The lock duration information obtaining unit 11 outputs the lock duration information T thus calculated to the lock standby operation selector unit 12.

In Step S3, the lock standby operation selector unit 12 reads the decision threshold value Th from the lock object LX, and compares the time length of exclusive use indicated by the lock duration information T received from the lock duration information obtaining unit 11 to the decision threshold value Th to determine whether the time length of exclusive use indicated by the lock duration information T is equal to the decision threshold value Th. When the time length of exclusive use indicated by the lock duration information T exceeds the decision threshold value Th as illustrated in a) of FIG. 2 (T>Th), the processing flow proceeds to Step S4 so that the lock standby operation selector unit 12 selects the spin lock mechanism 13. When the time length of exclusive use indicated by the lock duration information T is equal to or below the decision threshold value Th as illustrated in b) and c) of FIG. 2 (T≤Th), the processing flow proceeds to Step S5 so that the lock standby operation selector unit 12 selects the suspend lock mechanism 14.

In Step S4, the lock standby operation selector unit 12 activates the spin lock mechanism 13 to end the routine of the flow chart illustrated in FIG. 3A. Step S4 is implemented because a length of time comparable to the decision threshold value Th has already passed since the lock previously-acquiring processor PY succeeded in locking the sharable resource RX in the lock object LX, suggesting the prediction that the lock object LX is likely to shortly unlock the sharable resource RX currently locked by the lock previously-acquiring processor PY (see b) of FIG. 3). The processing of Step S4 (switching to the spin lock operation) subsequent to the prediction in Step S3 is a reasonably efficient processing step which does not involve an overly long standby time.

In Step S5, the lock standby operation selector unit 12 turns on the suspend lock mechanism 14 to end the routine of the flow chart illustrated in FIG. 3A. Step S5 is implemented because a length of time which already passed since the lock previously-acquiring processor PY succeeded in locking the sharable resource RX in the lock object LX is short enough to suggest the prediction that the lock object LX is unlikely to shortly unlock the sharable resource RX currently locked by the lock previously-acquiring processor PY (see FIG. 3B). Because it is unlikely that the process currently sleeping will be shortly waken up, the processing of Step S5 (sleep processing) subsequent to the prediction in Step S3 is a reasonably efficient processing step in which the right of execution is handed over to another process while the wakeup is awaited.

After the spin lock in Step S4 or the sleep in Step S5 is implemented, the lock object LX unlocks the sharable resource RX locked by the lock previously-acquiring processor PY (see FIG. 3B), and the attempt to lock the sharable resource RX requested by the lock currently-requesting processor PX in the lock object LX finally succeeds. When the lock acquisition attempt thus succeeds, the processing flow returns to Step S1 which determines that the lock acquisition succeeded, and then proceeds to Step S6.

In Step S6, the lock object management table 20 records information indicating the present time point in the lock start time information $t_s$ retained by the lock object LX, and then ends the routine of the flow chart illustrated in FIG. 3A (the lock acquisition processing steps end).

FIG. 3B illustrates a flow of lock release (unlocking) processing steps for the lock object. The processor which completed the lock acquisition for the sharable resource RX which needs inter-processor exclusive control (which is currently the lock currently-requesting processor and becomes the lock previously-acquiring processor as soon as the lock acquisition succeeds), when the acquired prior use of the sharable resource RX is no longer valid, reports the fact to the lock object LX. The lock object LX which received the report unlocks the sharable resource RX (Step S11).

According to the present exemplary embodiment, when the lock acquisition attempt fails, the lock duration information T calculated based on the lock start time information $t_s$ of the sharable resource RX retained in the lock object LX corresponding to the lock previously-acquiring processor RX is compared to the decision threshold value Th, and one of the lock standby operations more suitable than the other is selected based on the comparison result (more specifically, it is determined whether the time length of exclusive use indicated by the lock duration information T exceeds the decision threshold value Th). Therefore, the overhead required for exclusive control by the lock currently-requesting processor PX until the sharable resource RX locked by the lock previously-acquiring processor PY is unlocked by the lock object LX is significantly reduced. As a result, the lock currently-requesting processor LX, which is a resource device, can improve its usability.

According to the present exemplary embodiment, there are two lock mechanisms selected by the lock standby operation selector unit 12; spin lock mechanism 13, and suspend lock mechanism 14. The standby mechanism may be subject to changes depending on what lock standby operation is desirably carried out. Other examples of the lock mechanism are; reduction of number of clocks in a processor, switching a processor to a sleep mode (clock supply suspension mode), and prefetching caches. A similar configuration may be accomplished by software without providing any particular hardware devices.

The present time information described in Step S6 is, for example, a time stamp value of a free-running timer counted since a system startup, or the time information may be obtained from a dedicated timer which starts when the lock acquisition succeeds. In that case, the lock duration information T indicating the time length between the lock start and the present time pint can be obtained without providing the lock start time information $t_s$ in the lock object.

Exemplary Embodiment 2

Figure 4:
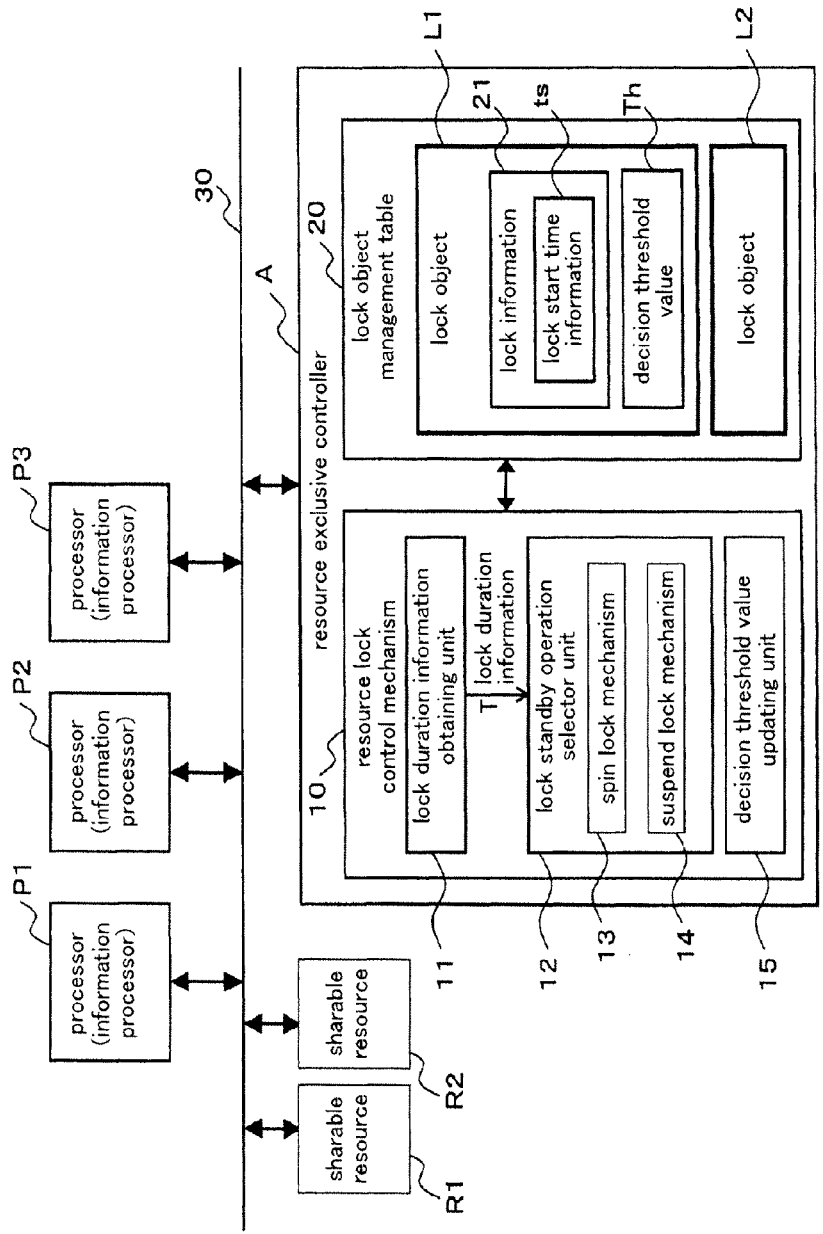
FIG. 4 is a block diagram illustrating a system configuration of a multiprocessor system provided with a resource exclusive controller according to an exemplary embodiment 2 of the present invention.

FIG. 4 is a block diagram illustrating a system configuration of a multiprocessor system provided with a resource exclusive controller according to an exemplary embodiment 2 of the present invention. In FIG. 4, the same reference symbols as those illustrated in FIG. 1 according to the exemplary embodiment 1 denote the same structural elements, therefore, will not be described in detail again. The present exemplary embodiment is technically characterized in that the resource exclusive controller further comprises a decision threshold value updating unit 15 configured to dynamically update the decision threshold value Th stored in the lock object LX depending on the time length of exclusive use of the sharable resource RX by the lock previously-acquiring processor PY. An operation of the resource exclusive controller according to the present exemplary embodiment follows the flow chart illustrated in FIG. 3A according to the exemplary embodiment 1.

FIG. 5 illustrates a flow of lock release processing steps for the lock object according to the exemplary embodiment 2. Subsequent to Step S11 in which the sharable resource RX is unlocked by the lock object LX, in Step S12, the decision threshold value updating unit 15 dynamically updates the decision threshold value Th stored in the lock object LX depending on the time length of exclusive use of the sharable resource RX by the lock previously-acquiring processor PY. The length of time between the lock start time information $t_s$ and the unlocking time point (time length of exclusive use) is a length of time set by the lock object LX during which the right of prior use of the sharable resource RX is granted to the lock currently-requesting processor PX. Therefore, the decision threshold value Th is dynamically updated depending on the time length of exclusive use, and the updated decision threshold value Th is newly set. The decision threshold value Th is increased as the time length of exclusive use is longer, whereas the decision threshold value Th is decreased as the time length of exclusive use is shorter. Such an adjustment is dynamically performed.

According to the present exemplary embodiment thus technically characterized, wherein the decision threshold value Th is updated and newly set depending on the time length of exclusive use, the decision threshold value Th can be updated more suitably for an actual operation so that the lock standby operation mechanism (spin lock mechanism 13 or suspend lock mechanism 14) can be more efficiently selected.

When the decision threshold value Th is dynamically changed only when the time length of exclusive use is shorter than the current decision threshold value Th (when the time length indicated by the lock duration information T passed by an earlier timing than indicated by the decision threshold value Th), the decision threshold value Th can be adjusted to a smaller value. The present invention is then applicable to a system where a very high lock acquisition speed is strictly demanded, and the decision threshold value Th can be updated more suitably for an actual operation. As a result, the lock standby operation mechanism (spin lock mechanism 13 or suspend lock mechanism 14) can be more efficiently selected.

An average value of the time lengths of exclusive use previously set in the sharable resource RX by a plurality of lock previously-acquiring processors PY during an arbitrary period of time up to present can be set as the decision threshold value Th. Then, the decision threshold value Th can be updated more suitably for an actual operation so that the lock standby operation mechanism (spin lock mechanism 13 or suspend lock mechanism 14) can be more efficiently selected.

Exemplary Embodiment 3

Figure 6:
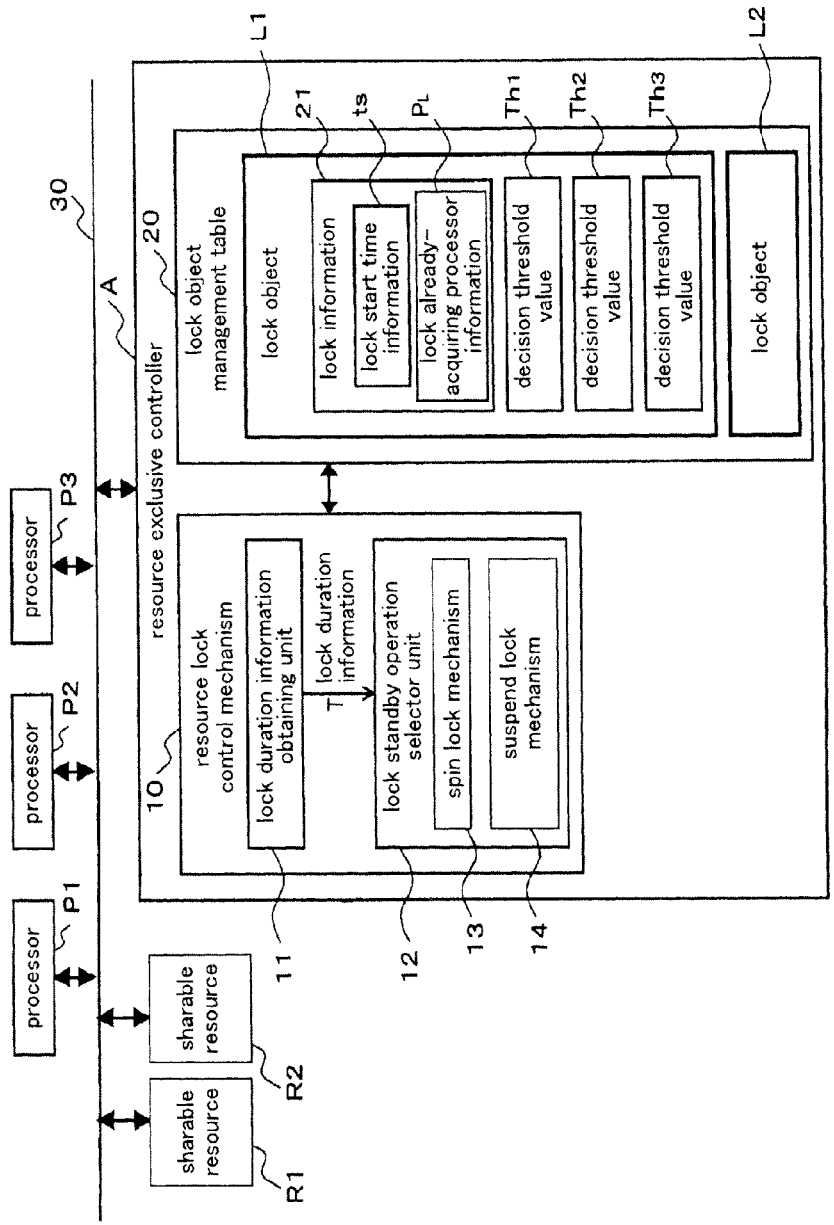
FIG. 6 is a block diagram illustrating a system configuration of a multiprocessor system provided with a resource exclusive controller according to an exemplary embodiment 3 of the present invention.

FIG. 6 is a block diagram illustrating a system configuration of a multiprocessor system provided with a resource exclusive controller according to an exemplary embodiment 3 of the present invention. In FIG. 6, the same reference symbols as those illustrated in FIG. 1 according to the exemplary embodiment 1 denote the same structural elements, therefore, will not be described in detail again. The present exemplary embodiment is technically characterized in that the lock object L1 of the lock object management table 20 further includes decision threshold values $Th_1$, $Th_2$, and $Th_3$ respectively corresponding to a plurality of processors P1, P2, and P3 are provided, and the lock information 21 further includes a lock previously-acquiring processor information $P_L$ indicating the lock already-required processor PY which already succeeded in locking the sharable resource RX in the lock object LX. The lock object L2 is configured similarly to the lock object L1. The technical characteristic of the present exemplary embodiment is applicable to the exemplary embodiment 2.

Figure 7:
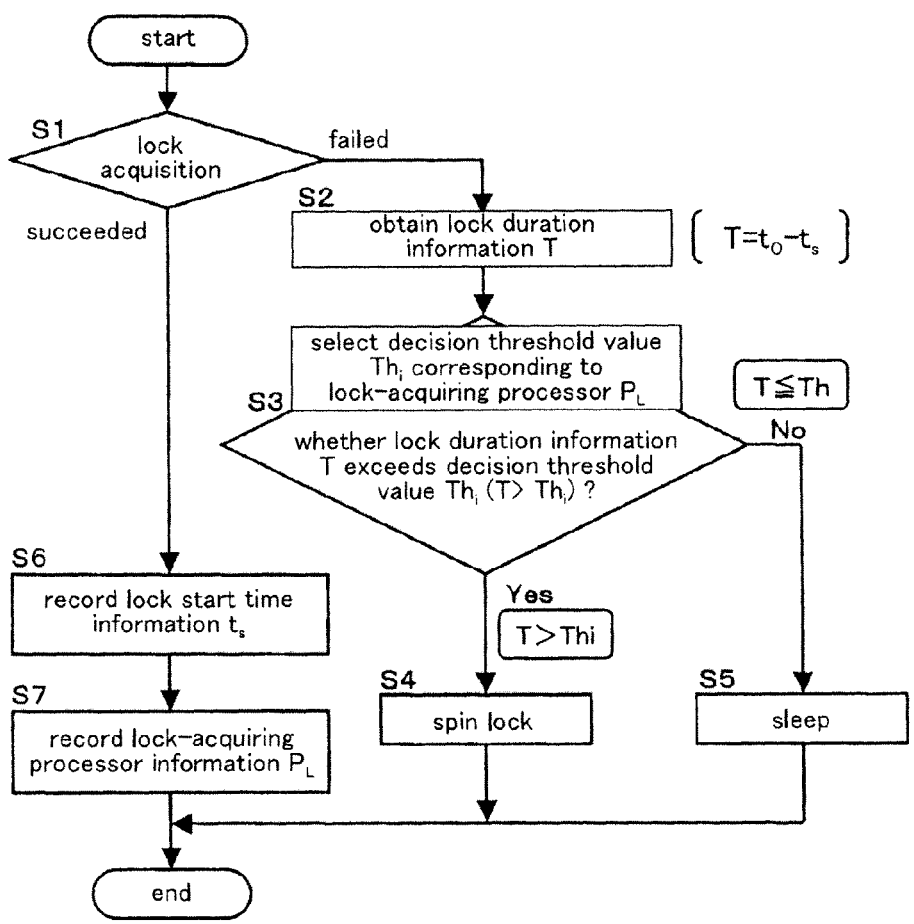
FIG. 7 is a flow chart of a lock acquisition routine in the resource exclusive controller according to the exemplary embodiment 3.

FIG. 7 illustrates a flow of lock acquisition processing steps for the lock object according to the exemplary embodiment 3. The flow chart of FIG. 7 further includes Step S7 after Step S6 is implemented when the lock acquisition succeeded. In Step S7, a processor identifier which identifies the lock previously-acquiring processor PY is recorded in the lock previously-acquiring processor information $P_L$ of the relevant lock object LX. The processor identifier is, for example, a CPU number allocated to each of a plurality of processors used to uniquely identify the processor.

In Step S3 which determines whether the time length of exclusive use indicated by the lock duration information T relevant to the lock previously-acquiring processor PY is larger than the decision threshold value Th, the lock standby operation selector unit 12 checks the lock previously-acquiring processor information $P_L$ in the lock information 21 to select a decision threshold value $Th_i$ (i=1, 2, 3) corresponding to a lock previously-acquiring processor $P_L$ from the decision threshold values $Th_1$, $Th_2$, and $Th_3$. Then, the lock standby operation selector unit 12 compares the selected decision threshold value $Th_i$ to the lock duration information T.

According to the present exemplary embodiment thus technically characterized, wherein the specific decision threshold value $Th_i$ is set for each processor $P_i$ (i=1, 2, 3) as the decision threshold value Th, the decision threshold value $Th_i$ most suitable for processing contents of each processor can be set in the case where the processing contents are variable. As a result, the lock standby operation mechanism (spin lock mechanism 13 or suspend lock mechanism 14) can be more efficiently selected.

In the case where the lock acquisition fails but there is another processor waiting for the lock object to be released, the lock standby operation mechanism (spin lock mechanism 13 or suspend lock mechanism 14) may be selected depending on the decision threshold values $Th_i$ of the lock previously-acquiring processor PY and the lock currently-requesting processor PX. For example, a sum total of the decision threshold values $Th_i$ of the lock previously-acquiring processor PY and the lock currently-requesting processor PX is compared to the lock duration information T so that the lock standby operation mechanism is selected based on a comparison result thereby obtained.

In the case where:
the processor P1 succeeds in locking the sharable resource RX in the lock object LX (processor P1 is the lock previously-acquiring processor PY);
the processor P2 requests the lock object LX to lock the sharable resource RX but the lock object LX denies the request, leaving the processor P2 on standby (processor P2 is a previously-requesting processor $PX_1$); and
the processor P3 then requests the lock object LX to lock the sharable resource RX but the lock object LX denies the request, leaving the processor P3 on standby (processor P3 is a subsequently-requesting processor $PX_2$),
a sum total of decision threshold values $Th_1$ and $Th_2$ of the lock previously-acquiring processor P1 and the lock previously-requesting processor P2 is compared to the lock duration information T, and the lock standby operation mechanism of the lock subsequently-requesting processor P3 is selected based on a comparison result thereby obtained.

According to the technical advantages of the present invention described so far, such unfavorable events will not happen; waiting in the spin-lock state over a long period of time for the lock object to be released in vain, and the overhead of context switch. As a result, the processors, which are resource devices, can improve their usability.

INDUSTRIAL APPLICABILITY

A resource exclusive control method and a resource exclusive controller according to the present invention can improve the usability of a plurality of processors which need exclusive control of a sharable resource. The resource exclusive control method and the resource exclusive controller thus technically advantageous are useful in home electric appliances equipped with processors capable of concurrently executing processes.

DESCRIPTION OF REFERENCE SYMBOLS 10 resource lock control mechanism
11 lock duration information obtaining unit
12 lock standby operation selector unit
13 spin lock mechanism
14 suspend lock mechanism
15 decision threshold value updating unit
20 lock object management table
21 lock information
A resource exclusive controller
L1, L2 lock object
P1, P2, P3 processor (information processor)
$P_L$ lock already-acquiring processor information (lock-acquiring information processor)
R1, R2 sharable resource
T lock duration information
Th, $Th_1$, $Th_2$, $Th_3$ decision threshold value
$t_s$ lock start time information

What is claimed is:

1. A resource exclusive control method used for exclusive control of a sharable resource between a plurality of information processors capable of concurrently executing processes, comprising:
   a step in which under the circumstances that a lock object which performs a restriction control on an exclusive use of the sharable resource is granting a second information processor a right of prior use of the sharable resource over a first information processor, a time length of exclusive use during which the sharable resource is exclusively used by the second information processor is measured, wherein the time length of exclusive use is a length of time from when the second information processor begins exclusive use of the sharable resource to when an attempt to acquire the right of prior use requested by the first information processor for the lock object fails, and
   a step in which at least two standby operations are set, the at least two standby operations being carried out by the first information processor until the right of prior use of the sharable resource granted to the second information processor is no longer valid, and the time length of exclusive use is compared to a decision threshold value preset for evaluation of the time length of exclusive use so that one of the standby operations suitable for a comparison result thereby obtained is selected,
   wherein the group of standby operations includes:
      a spin lock operation in which the first information processor repeatedly checks the lock object until the right of prior use is acquired; and
      a suspend lock operation in which the first information processor puts a first process which demands the right of prior use to a temporary sleep until the right of prior use granted to the second information processor is no longer valid and then requests again the lock object to acquire the right of prior use as soon as the right of prior use granted to the second information processor is no longer valid, and the first information processor wakes up the first process when the right of prior use is successfully acquired,
   wherein the spin lock operation is selected when the time length of exclusive use exceeds the decision threshold value, and the suspend lock operation is selected when the time length of exclusive use is at most the decision threshold value.

2. The resource exclusive control method as claimed in claim 1, wherein the time length of exclusive use is a count value of a timer read when the attempt to acquire the right of prior use requested by the first information processor for the lock object fails, wherein the timer is turned on when the second information processor begins exclusive use of the sharable resource.

3. The resource exclusive control method as claimed in claim 1, wherein the decision threshold value is dynamically updated depending on the time length of exclusive use.

4. The resource exclusive control method as claimed in claim 3, wherein the decision threshold value is dynamically updated when the time length of exclusive use falls below the decision threshold value.

5. The resource exclusive control method as claimed in claim 3, wherein the dynamical update of the decision threshold value is to update the decision threshold value to an average value of the time lengths of exclusive use.

6. The resource exclusive control method as claimed in claim 1, wherein a plurality of the decision threshold values are provided so as to correspond with number of the information processors, and the decision threshold values are each set in each of the information processors.

7. The resource exclusive control method as claimed in claim 1, wherein the information processors are processors in a multiprocessor system, and
   the lock object is a lock object for exclusive control between the processors in the multiprocessor system.

8. A resource exclusive controller which performs an exclusive control of a sharable resource between a plurality of information processors capable of concurrently executing processes, comprising:
   a processor;
   a lock object which performs, by the processor, a restriction control on an exclusive use of the sharable resource;
   a lock duration obtainer configured to, under the circumstances that the lock object is granting a second information processor a right of prior use of the sharable resource over a first information processor, measure a time length of exclusive use during which the sharable resource is exclusively used by the second information processor, wherein the time length of exclusive use is a length of time from when the second information processor begins exclusive use of the sharable resource to when an attempt to acquire the right of prior use requested by the first information processor for the lock object fails;
   a group of standby operation mechanisms including at least two standby operation mechanisms to be carried out by the first information processor until the right of prior use of the sharable resource granted to the second information processor is no longer valid; and
   a lock standby operation selector configured to compare the time length of exclusive use to a decision threshold value preset for evaluation of the time length of exclusive use to select one of the standby operation mechanisms suitable for a comparison result thereby obtained,
   wherein the group of standby operation mechanisms includes:
      a spin lock operator configured to make the first information processor repeatedly check the lock object until the right of prior use is acquired; and
      a suspend lock operator configured to put a first process of the first information processor which demands the right of prior use to a temporary sleep until the right of prior use granted to the second information processor is no longer valid and make the first information processor request again the lock object to acquire the right of prior use as soon as the right of prior use granted to the second information processor is no longer valid, and then wake up the first process when the right of prior use is successfully acquired, wherein the lock standby operation selector selects the spin lock operator when the time length of exclusive use exceeds the decision threshold value, and selects the suspend lock operator when the time length of exclusive use is at most the decision threshold value.

9. The resource exclusive controller as claimed in claim 8, wherein the time length of exclusive use is a count value of a timer read when the attempt to acquire the right of prior use requested by the first information processor for the lock object fails, wherein the timer is turned on when the second information processor begins exclusive use of the sharable resource.

10. The resource exclusive controller as claimed in claim 8, further comprising a decision threshold value updater configured to dynamically update the decision threshold value depending on the time length of exclusive use.

11. The resource exclusive controller as claimed in claim 10, wherein the decision threshold value is dynamically updated when the time length of exclusive use falls below the decision threshold value.

12. The resource exclusive controller as claimed in claim 10, wherein to dynamically update the decision threshold value, the decision threshold value updater updates the decision threshold value to an average value of the time lengths of exclusive use.

13. The resource exclusive controller as claimed in claim 8, wherein a plurality of the decision threshold values are provided so as to correspond with number of the information processors, and the lock standby operation selector sets each of the decision threshold values in each of the information processors.

14. The resource exclusive controller as claimed in claim 8, wherein the information processors are processors in a multiprocessor system, and the lock object is a lock object for exclusive control between the processors in the multiprocessor system.

* * * * *